Dec. 23, 1969   C. J. RICHARDS   3,486,053
AERIAL SYSTEMS

Filed Dec. 12, 1966   2 Sheets-Sheet 1

Dec. 23, 1969    C. J. RICHARDS    3,486,053
AERIAL SYSTEMS

Filed Dec. 12, 1966    2 Sheets-Sheet 2 ated Dec. 23, 1969

3,486,053
AERIAL SYSTEMS
Clement John Richards, Cowes, Isle of Wight, England, assignor to The Plessey Company Limited, Ilford, England, a British company
Filed Dec. 12, 1966, Ser. No. 601,068
Claims priority, application Great Britain, Dec. 13, 1965, 52,826/65
Int. Cl. H02k *17/02;* H01q *3/02*
U.S. Cl. 310—166                     2 Claims

ABSTRACT OF THE DISCLOSURE

The rotatable aerial structure of a radar or radio aerial system is mounted directly on the large rotor disc of an induction motor. Said disc is supported by pairs of rollers located at intervals around the disc near its outer periphery and a plurality of stator units are also angularly distributed around the disc.

---

This invention relates to aerial systems and has especial application to the turning gear of radar aerial structures.

In radar aerial systems it has hitherto commonly been the practice to drive aerial structures including rotatably mounted curved reflectors from an electric motor through reduction gearing. The gearboxes affording the reduction gearing for such drives are comparatively expensive and moreover they give rise to significant frictional losses.

The present invention in its broadest aspect provides an aerial system in which an aerial structure is arranged to be driven directly by the conductive disc of an induction motor.

In carrying out the invention the necessary torque for imparting the requisite drive speed to the aerial structure can be obtained by providing an appropriate number of stator units at spaced intervals adjacent the outer periphery of the rotor disc. In the case of large diameter rotor discs the movement of the disc part the stator units will be substantially linear.

The stator units preferably afford an even number of poles and for the purpose of minimising so-called edge and curvature losses each of the stator units should have as large a number of poles as possible and it should also be long in relation to its width.

The low speed control that can be achieved by the use of an induction disc motor enables the aerial structure to be driven directly from the motor without the need for the interposition of reduction gearing and its attendant disadvantages. The invention has especially advantageous application to very large satellite trackers or radio telescopes.

By way of example the present invention will now be described briefly with reference to the accompanying drawings, in which.

Figure 4:
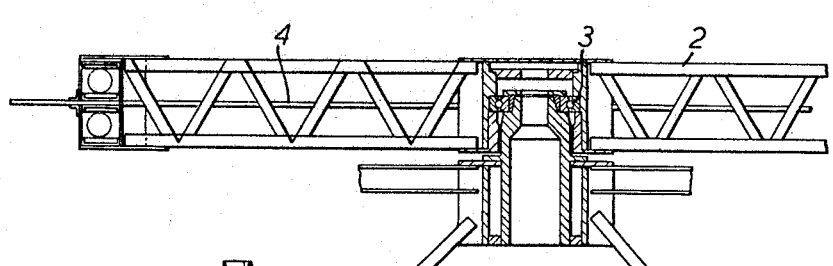

Referring to the drawing the aerial structure shown in outline 1 (FIGURE 2) is carried by a supporting or mounting structure 2 which is mounted for rotation in horizontal plane by means of a centre bearing arrangement 3 shown in section FIGURE 4. The aerial mounting structure includes an electrically conductive disc 4 of large diameter (e.g. the disc may be of the order of from 8′ to 16′ in diameter). This conductive disc 4 constitutes the disc of an induction disc motor provided in accordance with the invention for affording direct drive to the aerial structure 1 without the need for reduction gearing.

Figure 3:
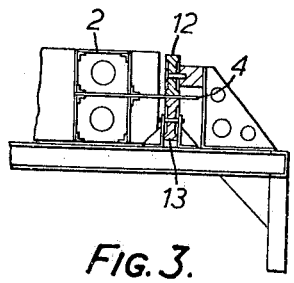
FIGURES 3 to 5 are fragmentary cross-sectional views taken along the lines A—A, B—B, C—C, respectively, in FIGURE 1.
Figure 2:
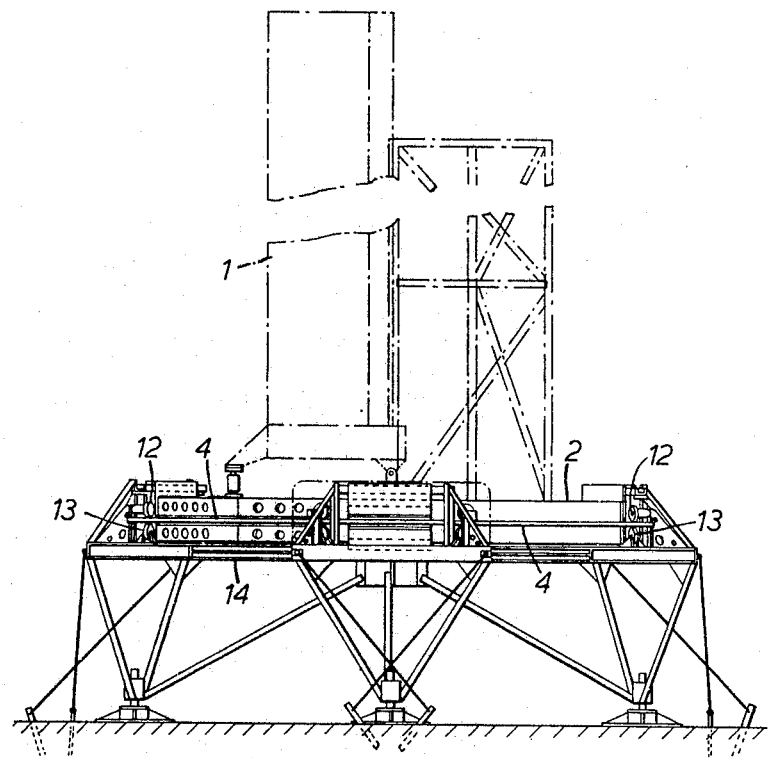
FIGURE 2 is a side elevational view of the structure of FIGURE 1.
Figure 5:
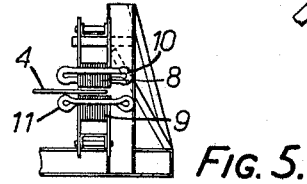

The stator of the induction disc motor comprises in the present example three discrete stator units indicated at 5, 6 and 7 which are spaced equiangularly about the disc axis. Each of the stator units comprises laminated cores 8 and 9 located above and below the disc 4 and embodying energising windings 10 and 11 as can clearly be seen from FIGURE 5 of the drawing which is taken through the stator unit 5. As can also be seen from FIGURE 5 the stator units are situated close to the outer periphery of the disc 4 and in this way the movement of the disc past the stator units is substantially linear. The outer part of the disc 4 runs between wheels, two of which designated 12 and 13 can be seen in FIGURE 3. In this way the upper wheels corresponding to wheel 12 resist the overturning movement thereas the lower wheels correspond to wheel 13 in FIGURE 3 serve as thrust wheels. The wheels 12 and 13 are mounted on a base supporting structure 14 (FIGURE 2). As has already been mentioned, in the interests of efficiency each of the stator units defines as many poles as possible whilst the width of the stator unit should be small compared with its length.

Figure 1:
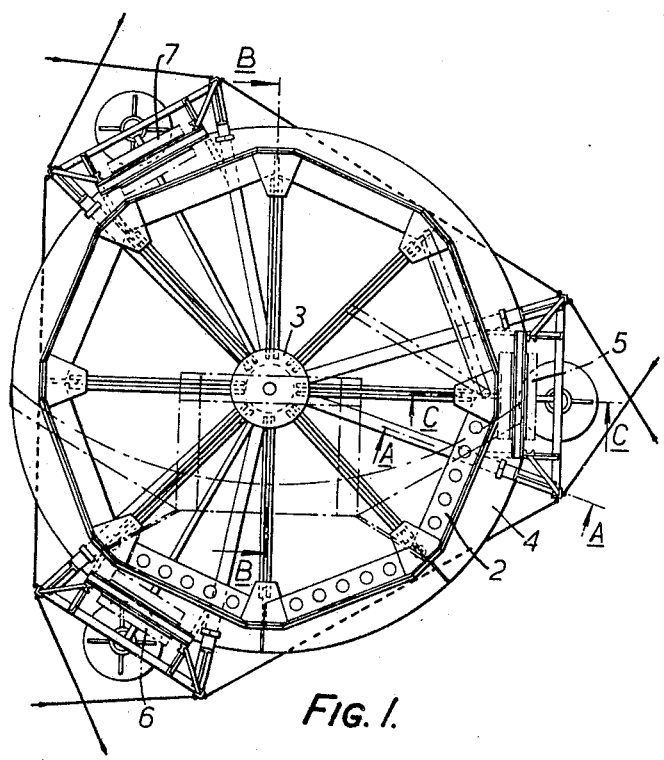
FIGURE 1 is a plan view of a radar aerial structure with turning gear.

By referring to FIGURE 1 of the drawing it will readily be appreciated that the stator of the motor could readily be modified by adding further stator units in order to increase the torque of the induction disc motor, as desired.

When the stator windings of the induction disc motor are energised the disc will rotate in order to rotate the aerial structure. The maximum speed of the rotor of the motor may for example be in the order of 16 r.p.m. for a 16′ diameter disc and this speed increasing with decrease in the disc diameter. The speed of the disc can be readily controlled within its speed range.

What is considered to be one of the principal advantages of the present invention is the manner in which the conduction disc motor lends itself to modification to provide for particular requirements by the addition or removal of standard stator units and by the substitution of discs of the requisite diameter according to the form weight and required turning speed of the aerial structure.

What I claim is:

1. A rotatable aerial system comprising an aerial structure; an induction motor having a large diameter rotor disc to which said aerial structure is directly coupled and having a plurality of stator units positioned at spaced points around said disc; and support means for rotatably supporting both sides of said disc near its outer periphery.

2. A rotatable aerial system as claimed in claim 1, in which said support means comprises a plurality of pairs of free running rollers distributed around said disc periphery and between which said rotor disc extends.

References Cited

UNITED STATES PATENTS

| 3,144,574 | 8/1964  | Henry-Baudot | 310—268   |
|-----------|---------|--------------|-----------|
| 2,483,895 | 10/1949 | Fisher.      |           |
| 3,194,032 | 7/1965  | Von Brimer   | 310—13 XR |
| 3,324,474 | 6/1967  | Gehman       | 343—766 X |

MILTON O. HIRSHFIELD, Primary Examiner

D. F. DUGGAN, Assistant Examiner

U.S. Cl. X.R.
310—268; 343—766